(12) United States Patent
Justino et al.

(10) Patent No.: US 11,465,077 B2
(45) Date of Patent: Oct. 11, 2022

(54) UNIT FOR TREATING A DRILLING MUD AND CORRESPONDING METHOD

(71) Applicant: SOLETANCHE FREYSSINET, Rueil Malmaison (FR)

(72) Inventors: Christophe Justino, Rueil Malmaison (FR); Christian Auvray, Rueil Malmaison (FR); Brice Janneau, Rueil Malmaison (FR)

( * ) Notice: Subject to any disclaimer, the term of this patent is extended or adjusted under 35 U.S.C. 154(b) by 2 days.

(21) Appl. No.: 17/070,960

(22) Filed: Oct. 15, 2020

(65) Prior Publication Data

US 2021/0024397 A1    Jan. 28, 2021

Related U.S. Application Data

(63) Continuation of application No. 15/574,162, filed as application No. PCT/FR2016/051194 on May 19, 2016, now abandoned.

(30) Foreign Application Priority Data

May 20, 2015   (FR) ........................................ 1554508

(51) Int. Cl.
    *C02F 1/56*      (2006.01)
    *B01D 21/26*    (2006.01)
    (Continued)

(52) U.S. Cl.
    CPC ........... *B01D 21/267* (2013.01); *B01D 21/01* (2013.01); *B04C 5/081* (2013.01); *B04C 5/12* (2013.01);
    (Continued)

(58) Field of Classification Search
    CPC ..................................................... C02F 11/147
    See application file for complete search history.

(56) References Cited

U.S. PATENT DOCUMENTS

| 5,422,012 A | 6/1995 | Adams |
| 2007/0221555 A1* | 9/2007 | Hodges ................. B01D 35/05 210/154 |

(Continued)

FOREIGN PATENT DOCUMENTS

| CN | 103288324 B | 3/2014 |
| FR | 2875495 A1 | 3/2006 |

(Continued)

OTHER PUBLICATIONS

English language abstract of CN 103288324.

(Continued)

*Primary Examiner* — Peter Keyworth
(74) *Attorney, Agent, or Firm* — Robert Facey

(57) ABSTRACT

A drilling mud treatment unit (100) comprises a primary duct (10) for feeding coagulated drilling mud, an in-line flocculation system (20) for flocculating the coagulated drilling mud flowing in the primary duct (10), and at least one hydrocyclone (30) fed by the primary duct (10) and arranged downstream from the flocculation system (20). The hydrocyclone (30) has an overflow orifice (32) for receiving a liquid product resulting from treatment of the drilling mud and an underflow orifice (34) for receiving a solid product resulting from treatment of the drilling mud. The overflow orifice (32) presents an overflow diameter (Do) and the underflow orifice presents an underflow diameter (Du), and the underflow diameter (Du) is greater than 1.1 times the overflow diameter (Do).

13 Claims, 3 Drawing Sheets

(51) Int. Cl.
- *B04C 5/081* (2006.01)
- *B04C 5/14* (2006.01)
- *C02F 1/38* (2006.01)
- *E21B 21/06* (2006.01)
- *B04C 5/13* (2006.01)
- *C02F 11/121* (2019.01)
- *C02F 11/147* (2019.01)
- *C02F 11/127* (2019.01)
- *B01D 21/01* (2006.01)
- *B04C 5/12* (2006.01)
- *C02F 1/52* (2006.01)

(52) U.S. Cl.
CPC .................. *B04C 5/13* (2013.01); *B04C 5/14* (2013.01); *C02F 1/38* (2013.01); *C02F 1/56* (2013.01); *C02F 11/121* (2013.01); *C02F 11/127* (2013.01); *C02F 11/147* (2019.01); *E21B 21/065* (2013.01); *C02F 1/5245* (2013.01); *C02F 2301/024* (2013.01)

(56) References Cited

U.S. PATENT DOCUMENTS

2007/0243118 A1 10/2007 Rousseaux et al.
2015/0321934 A1* 11/2015 Kobayashi ................ C02F 1/52
    210/724

FOREIGN PATENT DOCUMENTS

| JP | 55075787 A | 6/1980 |
| JP | 06170398 A | 6/1994 |
| JP | 2005205251 A | 8/2005 |

OTHER PUBLICATIONS

English language abstract of JP2005205251.
English language abstract of JP55075787.
English language abstract of JP06170398.

* cited by examiner

UNIT FOR TREATING A DRILLING MUD AND CORRESPONDING METHOD

TECHNICAL FIELD

The present disclosure relates to a unit for treating drilling mud, and to a corresponding treatment method.

BACKGROUND

The treatment unit and the treatment method of the disclosure are particularly adapted to treating drilling muds of the type used in deep foundation works such as diaphragm walls, rods, or piles, and also in the fields of tunnels and directional horizontal drilling.

During a drilling operation, the stability of the excavation or of the working face is obtained by filling the excavation with drilling mud. The mud forms a leakproof deposit on the walls of the excavation, which may be referred to as "cake", and which serves to limit percolation into the terrain and prevent the walls from caving in. When the depth of the excavation has reached the desired level, the installation is filled progressively with concrete, beginning under the mud in the bottom of the excavation.

While it is in use, drilling mud sees its qualities deteriorate on contact with the ground, potentially making it unsuitable for use. Its density increases inevitably during digging, because of the added cuttings. Unfortunately, excessive density limits the efficiency of excavation, prevents satisfactory transport of drilling cuttings, and degrades the effectiveness of the drilling tool.

In order to conserve a drilling mud that continues to comply with the requirements for drilling, it is essential to treat it continuously in order to extract the largest particles, generally having a diameter greater than 80 micrometers ($\mu m$). This is referred to as "de-sanding" the drilling mud. Nevertheless, after two or three treatment cycles, its qualities are too degraded for it to continue to be used. It is then necessary to work with new mud and to manage stocks of drilling mud that cannot be reused.

For reasons of protecting the environment, regulations in an increasing number of territories across the world no longer accept spent drilling muds being disposed of in liquid form. Consequently, it has been necessary to develop methods of separating and dehydrating muds in order to make them pelletable (i.e. transportable without being liquefiable under the effect of vibration or shear stresses), prior to sending them to landfill. Unfortunately, drilling muds are typically characterized by very great stability and uniformity. The combination of particles of very small size, having a median diameter of less than 100 $\mu m$, or even 80 $\mu m$, or indeed 20 $\mu m$ in most situations, associated with the presence of stabilizing agents such as certain clays or hydro-soluble organic polymers, gives them very great specific resistance against filtering and practically zero suitability for solid-liquid separation. In particular, drilling muds based on bentonite present stability and great resistance to settling/sedimentation because of their thixotropic nature.

Thus, in order to perform such separation on drilling muds so as to obtain a treatment product that is solid and pelletable, complex solid-liquid separation methods have been proposed, e.g. making use of rotary decanters comprising a rotary casing and, inside the casing, an extraction screw rotating in the same direction but at a different speed. Under the effect of centrifugal force, the dense solid particles of the mud are pushed towards the wall of the casing and then taken towards a first outlet of the decanter, while the liquid remains in the central portion, from which it is taken to a second outlet of the decanter. Such rotary decanters present the drawback of being very expensive and also very bulky.

In the publication of French patent application FR 2 875 495 A1, a mud treatment unit and method are described making use of a hydrocyclone for solid-liquid separation. Nevertheless, that disclosure relates to treating red muds coming from the Bayer method of fabricating alumina trihydrate, and does not relate to treating drilling muds. Although, like drilling muds, red muds do indeed present very fine grain size, they do not incorporate stabilizing agents such as those that make solid-liquid separation particularly difficult with drilling muds.

OBJECT AND SUMMARY

An object of the disclosure is to propose a drilling mud treatment unit and a corresponding method that remedy the above-mentioned drawbacks of the prior art.

In particular, an object of the disclosure is to propose a drilling mud treatment unit that is inexpensive and compact, and also a drilling mud treatment method that is inexpensive and easy to implement.

This object is achieved with a drilling mud treatment unit comprising:
- a primary duct for feeding coagulated drilling mud;
- an in-line flocculation system for flocculating the coagulated drilling mud flowing in the primary duct; and
- at least one hydrocyclone fed by the primary duct and arranged downstream from the flocculation system, the hydrocyclone having an overflow orifice for receiving a liquid product resulting from treatment of the drilling mud and an underflow orifice for receiving a solid product resulting from treatment of the drilling mud, the overflow orifice presenting an overflow diameter and the underflow orifice presenting an underflow diameter, and the underflow diameter being greater than the overflow diameter, with a ratio greater than 1.1 between the underflow diameter and the overflow diameter.

A hydrocyclone is a device that uses centrifugal force to separate solid particles in liquid suspension depending on their size. The hydrocyclone normally presents a main casing of cylindrical-conical shape that is fed tangentially under pressure and that has two outlets: an overflow orifice through which the finest particles and the liquid usually exit, and an underflow orifice through which the larger particles and a small fraction of liquid exit. Known hydrocyclones are typically used as classifiers for de-sanding drilling muds, or as thickeners in the field of water treatments, where they serve to thicken organic muds.

The inventors have shown that an appropriate ratio between the diameter of the overflow orifice and the diameter of the underflow orifice, associated with a physico-chemical coagulation/flocculation treatment of the drilling mud enables the action of the hydrocyclone to be modified so as to obtain, in underflow, a solid treatment product from drilling muds that is pelletable.

The term, "a solid treatment product that is pelletable" is used herein to mean a product of solid consistency suitable for preventing flow, thus making it suitable for pelleting. For example, such a product should not present any measurable flow in a Marsh cone flow test, as defined for example in API Recommended Practice 13B-2. In underflow from the hydrocyclone, the solid treatment product may be accompanied by free water that can easily be separated therefrom, given the solid consistency of the solid treatment product, merely by gravity on a grid.

A liquid treatment product of drilling mud is on the contrary a product presenting liquid flow that does not enable it to be pelleted, this flow being measurable by the Marsh cone flow test.

In an example, the primary feed duct may be provided with a pump, and the in-line flocculation system may include a secondary duct for feeding flocculating agent, said secondary duct then being connected to the primary duct at a junction situated downstream from the pump.

In an example, the in-line flocculation system may comprise in-line mixer means for mixing the coagulated drilling mud and the flocculating agent, said means being provided in the primary duct downstream from the junction. These means facilitate mixing the flocculating agent with the coagulated drilling mud in order to form the flocculated drilling mud that is to be fed to the hydrocyclone.

For example, the mixer means may comprise a static mixer. Such a mixer guarantees good flocculation by ensuring good mixing of the coagulated drilling mud with the flocculating agent, while preserving the flocs formed by the mixing.

In a particular provision, in order to enable the mixture of coagulated drilling mud and flocculating agent to reach the hydrocyclone rapidly, the mixer means are arranged at a distance from the hydrocyclone in the primary duct that is shorter than 5 meters (m), for example, shorter than 2 m.

The ratio between the underflow diameter and the overflow diameter may lie in the range 1.1 to 1.6.

The present disclosure also provides a treatment method for treating drilling mud, the method comprising at least the following succession of steps:
  feeding a primary feed duct with coagulated drilling mud;
  flocculating said coagulated drilling mud in-line while it is flowing in said primary duct;
  introducing the coagulated and flocculated drilling mud into a hydrocyclone having an overflow orifice presenting an overflow diameter, and an underflow orifice presenting an underflow diameter, the underflow diameter being greater than the overflow diameter, with a ratio greater than 1.1 between the underflow diameter and the overflow diameter; and
  discharging a solid product resulting from treatment of the drilling mud via the underflow orifice and a liquid product resulting from treatment of the drilling mud via an overflow orifice.

Furthermore, free water may be discharged, together with the solid treatment product, via the underflow orifice.

In particular, the drilling mud may include a stabilizing agent such as, for example, smectic clay and/or a hydrosoluble organic polymer. Smectic clays suitable for use as stabilizing agents in such drilling muds, include in particular various bentonites (natural sodium bentonite, activated sodium bentonite, sodium-calcium bentonite, or calcium bentonite), sepiolite, and attapulgite. For their use as a stabilizing agent for drilling mud, they may be incorporated in the drilling mud in the form of fine powders with particles having a mean size of less than 100 μm and a water content that may lie in the range 5% to 20%. Hydrosoluble organic polymers that are also suitable for use as stabilizing agents in such drilling muds, include in particular modified celluloses and their derivatives (carboxymethyl cellulose, polyanionic cellulose, hydroxyethyl cellulose), xanthan gum, and guar gum. Furthermore, in most circumstances, the drilling mud may be formed by an aqueous suspension of particles having a mean size smaller than 100 μm, or indeed 80 μm, or even 20 μm.

In an example, the solid treatment product may present dryness—i.e. percentage by weight of solid matter—that is greater than 30%.

In an example, the liquid treatment product may be water having less than 600 milligrams per liter of matter in suspension.

In a particular provision, the primary duct may be fed under turbulent conditions.

BRIEF DESCRIPTION OF THE DRAWINGS

The disclosure can be better understood on reading the following detailed description given by way of non-limiting indication with reference to the accompanying drawings, in which.

DETAILED DESCRIPTION

Figure 1:
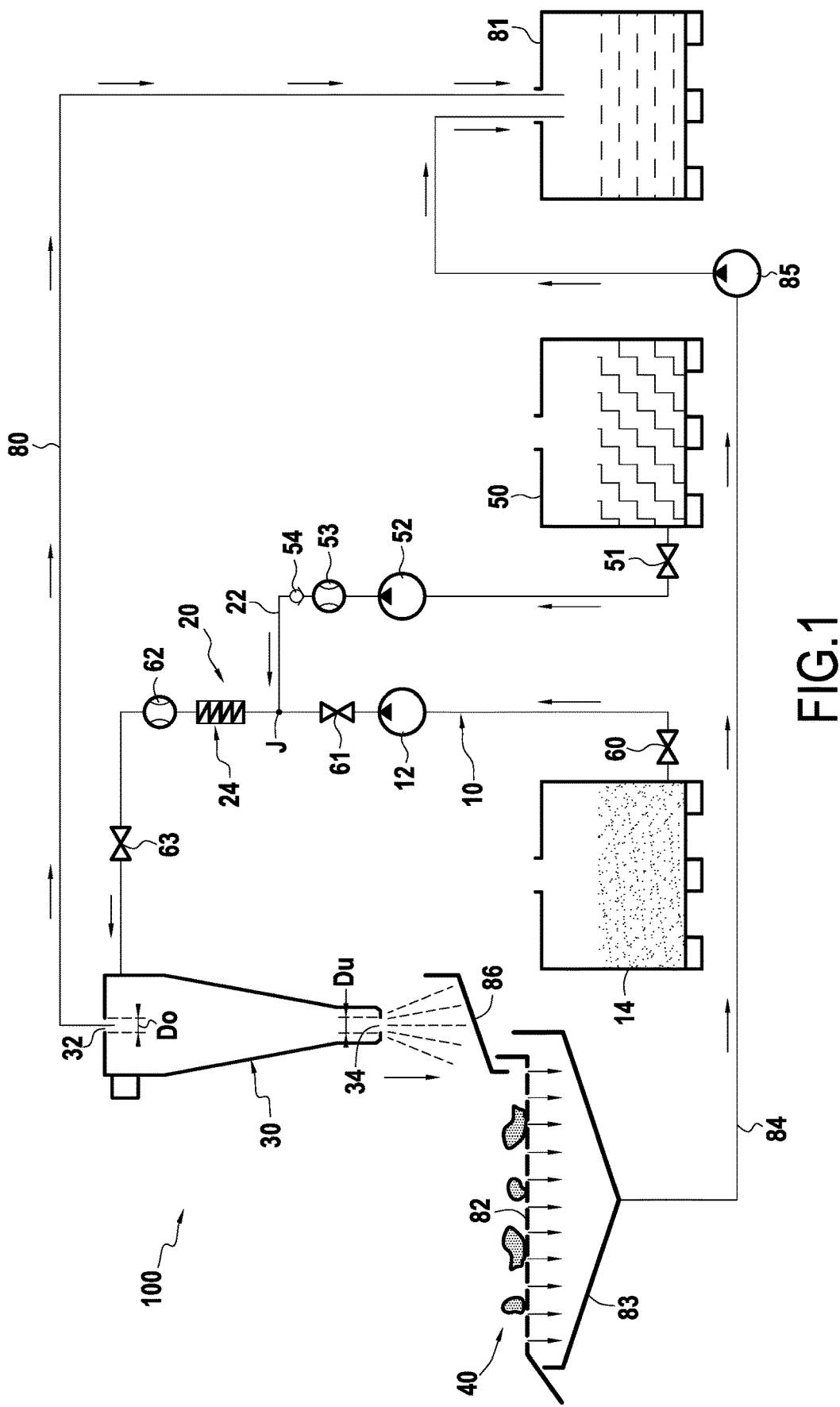
FIG. 1 is a diagram showing a mud treatment unit.

FIG. 1 is a diagram showing a drilling mud treatment unit 100 in an embodiment of the disclosure.

In this embodiment, the treatment unit 100 comprises:
  a primary duct 10 for feeding coagulated drilling mud, which duct is connected to a coagulated drilling mud storage vessel 14;
  an in-line flocculation system 20 for flocculating the coagulated drilling mud flowing in the primary duct 10; and
  a hydrocyclone 30 fed by the primary duct 10 and arranged downstream from the flocculation system 20.

The primary duct 10 is thus connected to a vessel 14 for storing coagulated drilling mud at one of its ends, and to the hydrocyclone 30 at another end. The primary duct 10 is also connected, via a junction referenced J in FIG. 1 and situated between its two ends, to a secondary duct 22 for feeding flocculating agent.

The secondary duct 22 is connected via one end to the primary duct 10 (at the junction J) and at its other end to a vessel 50 of flocculating agent.

In order to provide a controlled flow of the aqueous solution of flocculating agent, a valve 51, a pump 52, a constriction 53, and a check valve 54 are arranged in succession in the flow direction of this aqueous solution, between the two ends of the secondary duct 22, as shown in FIG. 1. The pump 52 may for example be a screw pump, also known as a pigtail pump or a PCM pump. This type of pump presents the advantage of shearing the flocculating agent little or not at all, thus making it possible to avoid deteriorating its properties.

In the primary duct 10, a first valve 60, a pump 12, and a second valve 61 are situated in succession in the flow direction of the coagulated drilling mud between the vessel 14 for storing coagulated drilling mud and the junction J, in order to provide controlled flow of the coagulated drilling mud towards the junction J. By way of example, the pump 12 may be a centrifugal pump.

A static mixer 24 is installed in the primary duct 10, directly downstream from the junction J in order to ensure that the flocculating agent is indeed mixed with the coagulated drilling mud. A constriction 62 and a valve 63 are then situated in the primary duct 10, in succession in the flow direction of the mixture, between the static mixer 24 and the hydrocyclone 30.

In the particular arrangement shown in FIG. 1, the primary duct 10 may not have a pump downstream from the junction J, in order to avoid impeding flocculation or destroying flocs before they reach the hydrocyclone 30. Nevertheless, the alternative is also possible. In order to obtain transport of the mixture from the mixer 24 that is as rapid as possible, the length of the primary duct 10 between the mixer 24 and the hydrocyclone 30 may be shorter than 5 m, or indeed shorter than 2 m.

FIGS. 2A, 2B, and 3A, 3B show two alternative embodiments of the hydrocyclone 30 in detail. In each of them, the hydrocyclone 30 comprises a main body 70, a tangential feed duct 72, and orifices 32 and 34 comprising respectively an overflow orifice 32 and an underflow orifice 34. The main body 70 is hollow and provided with an upside-down conical portion 71 of height H1. The tangential feed duct 72, which is connected to the primary duct 10, opens out into the inside of the main body 70 close to its top, and is directed in a transverse plane that is substantially orthogonal to a central axis Z of the conical portion 71, being laterally offset from the central axis Z, so as to obtain rotary motion around the central axis X for the mixture of coagulated mud and flocculating agent as it enters into the main body 70. The overflow and underflow orifices 32 and 34 are substantially in alignment with the central axis Z of the conical portion 71. The overflow orifice 32 extends upwards from an outlet inside the main body 70, below the level of the tangential feed duct 72, and it presents an overflow diameter Do, while the underflow orifice 34 extends downwards from the inside of the main body 70 at the bottom tip of the conical portion 71, and presents an underflow diameter Du. The underflow diameter Du is greater than 1.1 times the overflow diameter Do, and in particular it may lie in the range 1.1 times to 1.6 times the overflow diameter Do.

Figure 2A:
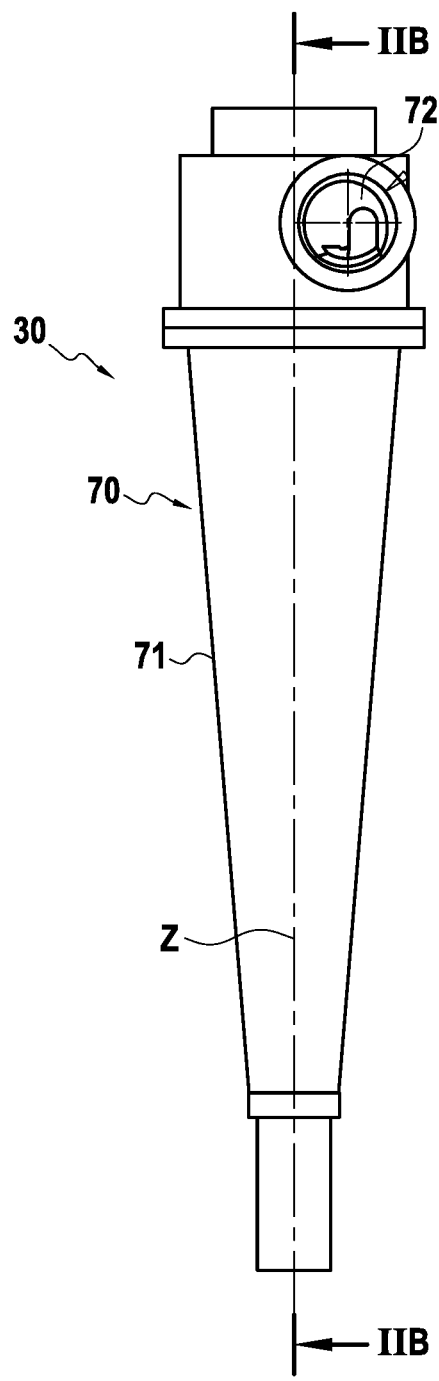
FIG. 2A is a diagram in side view of a hydrocyclone of the FIG. 1 drilling mud treatment unit in a first embodiment.
Figure 2B:
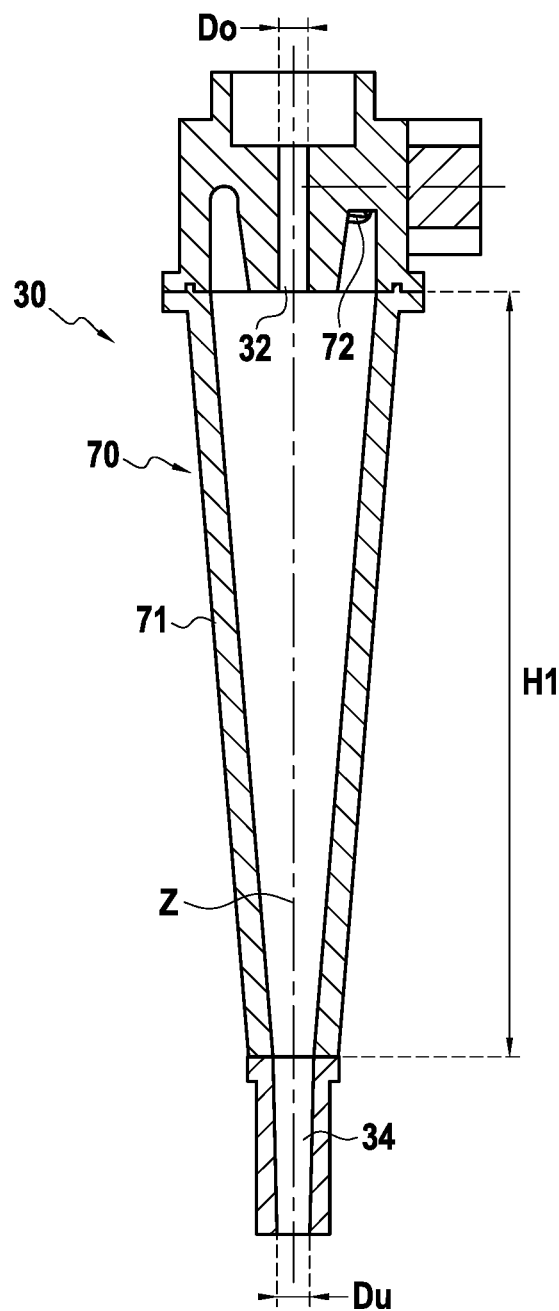
FIG. 2B is a diagrammatic longitudinal section view of the FIG. 2A hydrocyclone.
Figure 3A:
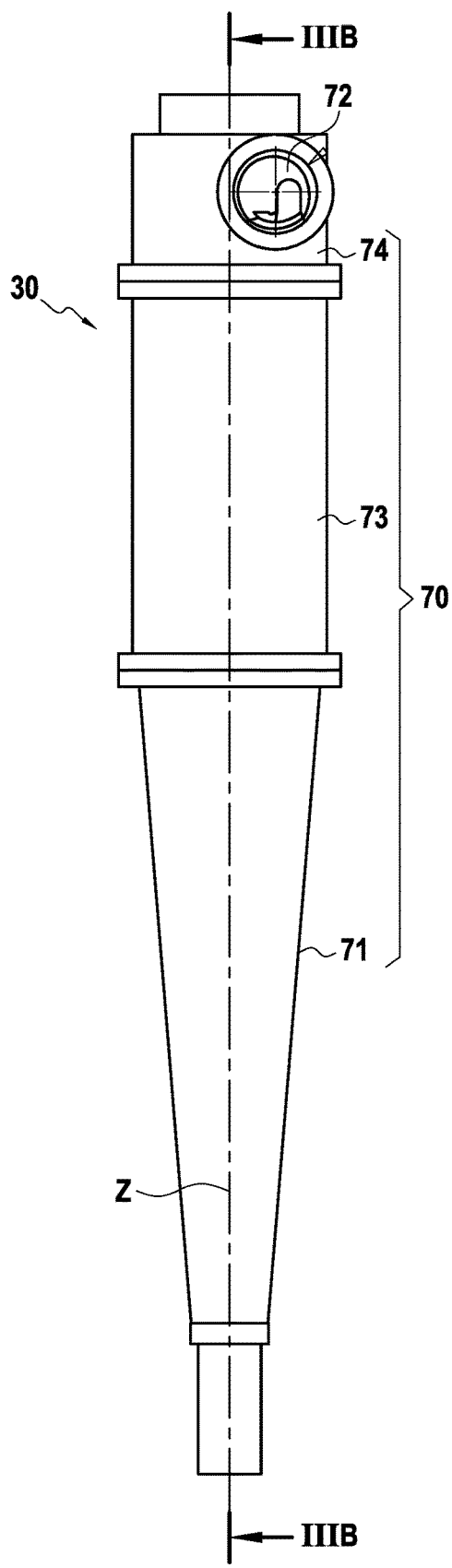
FIG. 3A is a diagram in side view of a hydrocyclone of the FIG. 1 drilling mud treatment unit in a second embodiment.
Figure 3B:
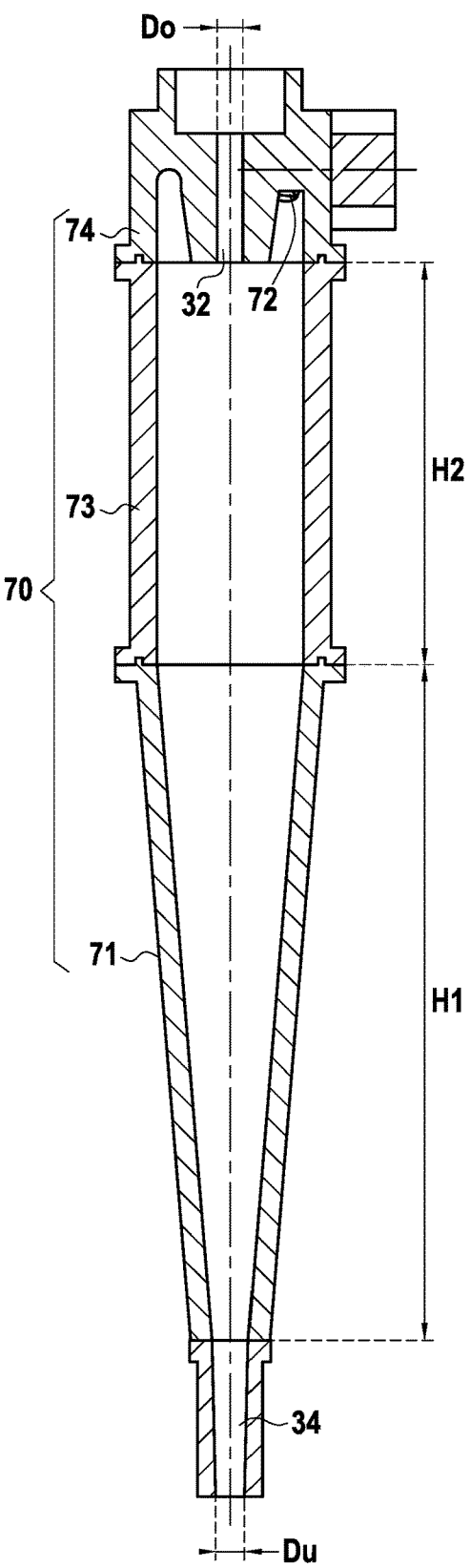
FIG. 3B is a diagrammatic longitudinal section view of the FIG. 3A hydrocyclone.

Whereas in the hydrocyclone 30 of the first embodiment, shown in FIGS. 2A and 2B, and referred to as "Type 1", the tip of the conical portion 71 is at substantially the same level as the outlet of the underflow orifice 32, in the hydrocyclone 30 of the second embodiment, referred to as "Type 2", shown in FIGS. 3A and 3B, the main body 70 also has a cylindrical portion 73 interposed between the conical portion 71 and a top portion 74, in which there are formed the tangential feed duct 72 and the overflow orifice 32. This cylindrical portion 73 presents a height H2.

Returning now to FIG. 1, the overflow orifice 32 is connected to a duct 80 for recovering a liquid treatment product of the drilling mud that opens out into a liquid tank 81. The underflow orifice 34 opens out above a sloping plane 86 leading to a grid 82. A free water recovery funnel 83 is arranged under the grid 82 and is connected to a free water recovery duct 84, that also leads to the liquid tank 81. A pump 85 may be situated in the free water recovery duct 84 in order to cause the free water to flow to the tank 81.

When the drilling mud treatment unit 100 is in operation, the coagulated liquid mineral drilling mud is extracted from the vessel 14 via the primary duct 10. By way of example, this coagulated liquid mineral drilling mud may be the product of prior mixing of a liquid mineral drilling mud with a coagulating agent selected from salts of iron and/or aluminum or cationic polymers. This treatment method is particularly advantageous for degraded drilling muds, having a density lower than 1.5 kilograms per cubic decimeter ($kg/dm^3$), a viscosity greater than 1 millipascal-second (mPa·s), and in which at least 80% by weight of the solid fraction is made up of inorganic materials. The coagulating agent may in particular be ferric chloride added to the liquid mineral mud at a proportion of up to 6 cubic decimeters ($dm^3$) of aqueous solution having 41% by volume of ferric chloride, per cubic meter of mud.

The diameter of the primary duct 10 may be selected as a function of the flow rate, the viscosity, and the density of the coagulated liquid mineral drilling mud in order to ensure that this drilling mud flows in turbulent manner along the primary duct 10. For this purpose, the diameter of the primary duct 10 may be selected so as to obtain a Reynolds number Re that is equal to or greater than 4000.

From the junction J, and in particular in the mixer 24, the coagulated drilling mud is mixed with the flocculating agent in aqueous solution extracted simultaneously via the secondary duct 22 from the vessel 50 of flocculating agent. By way of example, the flocculating agent may be selected from anionic and/or cationic polyacrylamides, and in particular those having high or very molecular weight, which may be linear, branching, or cross-linked. For an anionic polyacrylamide, the term "high" molecular weight means a molecular weight in the range 10,000 kilogram mole (kg/mol) to 15,000 kg/mol, and the term "very high" molecular weight is used to mean a molecular weight in the range 15,000 kg/mol to 20,000 kg/mol. For a cationic polyacrylamide, the term "high" molecular weight is used to mean a molecular weight in the range 5000 kg/mol to 10,000 kg/mol, and the term "very high" molecular weight is used to mean a molecular weight greater than 10,000 kg/mol. The concentration of the aqueous solution of flocculating agent may for example be 1 kilogram (kg) to 3 kg of flocculating agent per cubic meter, and it may be mixed with the drilling mud at a volume proportion lying in the range three parts coagulated drilling mud for two parts aqueous solution of flocculating agent to nine parts coagulated drilling mud for one part aqueous solution of flocculating agent.

On reaching the hydrocyclone 30, under the effect of its tangential feed, the mixture of coagulated drilling mud and flocculating agent is subjected to rotary motion leading to centrifuging. A solid product resulting from treatment of the drilling mud moves towards the outer wall of the main body 70 in order to be removed by underflow, while a liquid product resulting from the treatment becomes concentrated in the center of the main body in order to be removed by overflow.

The solid treatment product leaving via the underflow orifice 34 then drops onto the sloping plane 86 taking it to the grid 82, which separates it from the free water that also leaves via the underflow orifice 34. This free water is removed by the recovery duct 84 and taken to the liquid tank 81. The liquid treatment product is also removed to the liquid tank 81, via the duct 80. This treatment method in the treatment unit 100 thus makes it possible, starting from a liquid mineral drilling mud, to obtain a solid treatment product having dryness that may be greater than 30%, but above all having a consistency that is pelletable so as to enable it to be sent to landfill.

The table below gives two implementations of the method, starting from the same liquid mineral drilling mud, with different treatment parameters and with the hydrocyclones of Types 1 and 2, resulting in each example in a solid treatment product that is pelletable:

|  | Example 1 | Example 2 |
| --- | --- | --- |
| Coagulated mud density | 1.2 kg/dm³ | 1.2 kg/dm³ |
| Coagulated mud dryness | 25% | 25% |
| Coagulant | Aqueous solution of 41% by vol. of $FeCl_3$ (4 dm³ per m³ of coagulated drilling mud) | Aqueous solution of 41% by vol. of $FeCl_3$ (4 dm³ per m³ of coagulated drilling mud) |
| Solution for flocculation | Aqueous solution of anionic polyacrylamide of very high molecular weight and low anionicity (2 g/l) | Aqueous solution of anionic polyacrylamide of high molecular weight and low anionicity (2 g/l) |
| Volume ratio of coagulated mud/flocculation solution | 70/30 | 70/30 |
| Hydrocyclone feed pressure | 0.2 MPa | 0.2 MPa |
| Hydrocyclone feed rate | 9.5 m³/h | 12.5 m³/h |
| Type of hydrocyclone | Type 1 | Type 2 |
| Height H1 | 470 mm | 470 mm |
| Height H2 | — | 280 mm |
| Du/Do ratio | 1.11 | 1.11 |
| Underflow rate | 6.4 m³/h | 8.2 m³/h |
| Solid product dryness | 43% | 45% |

In both cases, the solid treatment product from the underflow of the hydrocyclone 30, accompanied by free water, does not present any measurable gravity flow in a Marsh cone flow test, e.g. as defined in API Recommended Practice 13B-2, and presents cohesion greater than 300 Pa using the "slump test" proposed by Baudez et al. in the article "Rheological interpretation of the slump test", Applied Rheology, 12(3), pp. 133-141, of 2002, even when starting from drilling muds that are uniform and stable that present Marsh cone flow with values lying in the range 32 seconds (s) to 180 s, with cohesion of less than 50 Pa.

In contrast, if the drilling mud is not coagulated prior to the flocculation step, for example, then the dryness of the underflow product is much lower, as can be seen in the following comparative example:

|  | Comparative example |
| --- | --- |
| Mud density | 1.2 kg/dm³ |
| Mud dryness | 25% |
| Flocculation solution | Aqueous solution of anionic polyacrylamide of high molecular weight and low anionicity (2 g/l) |
| Volume ratio of coagulated mud/flocculation solution | 66/34 |
| Hydrocyclone feed pressure | 0.2 MPa |
| Hydrocyclone feed rate | 10 m³/h |
| Type of hydrocyclone | Type 2 |
| Height H1 | 470 mm |
| Height H2 | 280 mm |
| Du/Do ratio | 1.11 |
| Solid product dryness | <20% |

Although the present disclosure is described with reference to specific embodiments, it is clear that various modifications and changes may be undertaken on those embodiments without going beyond the general ambit of the disclosure as defined by the claims. In addition, individual characteristics of the various embodiments mentioned may be combined in additional embodiments. Consequently, the description and the drawings should be considered in a sense that is illustrative rather than restrictive.

The invention claimed is:

1. A treatment method for treating drilling mud, the method comprising at least the following succession of steps:
    mixing the drilling mud with a coagulating agent to produce a coagulated drilling mud;
    feeding a primary feed duct with the coagulated drilling mud;
    flocculating the coagulated drilling mud in-line while it is flowing in the primary feed duct to produce a coagulated and flocculated drilling mud;
    introducing the coagulated and flocculated drilling mud into a hydrocyclone having an overflow orifice presenting an overflow diameter, and an underflow orifice presenting an underflow diameter, the underflow diameter being greater than the overflow diameter, with a ratio greater than 1.1 between the underflow diameter and the overflow diameter; and
    discharging a solid product resulting from treatment of the drilling mud via the underflow orifice, and a liquid product resulting from treatment of the drilling mud via an overflow orifice.

2. The treatment method according to claim 1, wherein the step of flocculating the coagulated drilling mud includes feeding a flocculating agent through a secondary duct connected to the primary duct at a junction situated downstream from a pump of the primary feed duct.

3. The treatment method according to claim 2, wherein the step of flocculating the coagulated drilling mud further includes mixing the coagulating drilling mud and the flocculating agent with an in-line mixer provided in the primary duct downstream from the junction.

4. The treatment method according to claim 3, wherein the in-line mixer comprises a static mixer.

5. The treatment method according to claim 3, wherein the in-line mixer is arranged at a distance from the hydrocyclone in the primary duct that is shorter than 5 m.

6. The treatment method according to claim 1, wherein the drilling mud includes a stabilizing agent.

7. The treatment method according to claim 6, wherein the stabilizing agent includes smectic clay.

8. The treatment method according to claim 6, wherein the stabilizing agent includes a hydrosoluble organic polymer.

9. The treatment method according to claim 1, wherein the solid product of treating the drilling mud presents a percentage by weight of solid matter greater than 30%.

10. The treatment method according to claim 1, wherein the liquid product of treating the drilling mud is water containing less than 600 milligrams per liter of matter in suspension.

11. The treatment method according to claim 1, wherein the primary duct is fed with the coagulated drilling mud under turbulent conditions.

12. The treatment method according to claim 1, wherein free water is discharged via the underflow orifice together with the solid product, and further comprising a subsequent step of separating the free water from the solid product on a grid.

13. The treatment method according to claim 1, wherein the solid product does not present any measurable gravity flow in a Marsh cone flow test as defined in API Recommended Practice 13B 2.

* * * * *